United States Patent
Pelletier et al.

(10) Patent No.: US 9,958,093 B2
(45) Date of Patent: May 1, 2018

(54) FLEXIBLE HOSE ASSEMBLY WITH MULTIPLE FLOW PASSAGES

(75) Inventors: Robert Roger Pelletier, Chardon, OH (US); Raman Ras, Painesville, OH (US)

(73) Assignee: PARKER-HANNIFIN CORPORATION, Cleveland, OH (US)

( * ) Notice: Subject to any disclaimer, the term of this patent is extended or adjusted under 35 U.S.C. 154(b) by 1267 days.

(21) Appl. No.: 13/315,150

(22) Filed: Dec. 8, 2011

(65) Prior Publication Data

US 2012/0145247 A1 Jun. 14, 2012

Related U.S. Application Data

(60) Provisional application No. 61/420,803, filed on Dec. 8, 2010.

(51) Int. Cl.
  *F16L 11/22* (2006.01)
  *F16L 33/207* (2006.01)
  *F16L 39/02* (2006.01)

(52) U.S. Cl.
  CPC ........... *F16L 11/22* (2013.01); *F16L 33/2073* (2013.01); *F16L 39/02* (2013.01); *Y10T 137/0318* (2015.04)

(58) Field of Classification Search
  CPC ......... F16L 11/22; F16L 33/2073; F16L 39/02
  USPC ........ 285/123.17, 123.1–123.16, 222.4, 239; 138/148, 114, 109, 111, 112, 113, 139
  See application file for complete search history.

(56) References Cited

U.S. PATENT DOCUMENTS

| | | | | |
|---|---|---|---|---|
| 1,363,320 | A | * 12/1920 | Horiuchi | F16L 19/0218 285/336 |
| 2,070,291 | A | * 2/1937 | Mchugh | F16L 19/0218 138/140 |
| 2,363,586 | A | * 11/1944 | Guarnaschelli | F16L 33/01 285/222.5 |
| 2,391,063 | A | 12/1945 | Madsen | |
| 2,475,635 | A | * 7/1949 | Parsons | 285/123.15 |
| 2,752,579 | A | * 6/1956 | Caldwell | F16L 25/023 174/85 |
| 2,787,481 | A | 4/1957 | Buschow et al. | |
| 3,105,708 | A | * 10/1963 | Esty | 285/41 |
| 3,285,007 | A | 10/1964 | Carlisle et al. | |
| 3,186,488 | A | 6/1965 | Johnson et al. | |

(Continued)

FOREIGN PATENT DOCUMENTS

EP  1 736 651  10/2010
JP  09-280073  10/1997

*Primary Examiner* — James M Hewitt, II
(74) *Attorney, Agent, or Firm* — Renner, Otto, Boisselle & Sklar, LLP

(57) ABSTRACT

Provided is a flexible hose assembly having a flexible tube for conveying fuel through a first fuel passage formed interiorly of the flexible tube and a flexible hose surrounding the flexible tube and forming therewith a second fuel passage. The flexible tube provides internal support for the flexible hose while also allowing for flow of fuel through the second fuel passage and the fuel passages are separate from one another along a length of the flexible hose assembly. When one of the fuel passages is in a low flow or no flow condition, fuel flowing through the other of the fuel passages acts to cool the fuel passage in the low flow or no flow condition to prevent stagnant fuel in the passage from heating up and coking.

21 Claims, 7 Drawing Sheets

(56) References Cited

U.S. PATENT DOCUMENTS

| | | | |
|---|---|---|---|
| 3,691,765 A | 9/1972 | Carlisle | |
| 3,713,588 A | 1/1973 | Sharpe | |
| 3,820,827 A | 6/1974 | Boelkins | |
| 4,305,255 A | 12/1981 | Davies et al. | |
| 4,467,610 A * | 8/1984 | Pearson et al. | 60/739 |
| 4,474,014 A | 10/1984 | Markowski | |
| 5,062,792 A | 11/1991 | Maghon | |
| 5,263,314 A * | 11/1993 | Anderson | 60/39.094 |
| 5,423,178 A | 6/1995 | Mains | |
| 5,427,419 A | 6/1995 | Frey et al. | |
| 5,570,580 A | 11/1996 | Mains | |
| 6,305,476 B1 * | 10/2001 | Knight | E21B 17/0423 166/242.2 |
| 6,950,441 B1 | 9/2005 | Kaczmarczyk et al. | |
| 7,028,483 B2 | 4/2006 | Mansour et al. | |
| 7,107,773 B2 | 9/2006 | Little | |
| 7,305,830 B2 | 12/2007 | Fish | |
| 7,762,073 B2 | 7/2010 | Li et al. | |
| 7,849,693 B2 | 12/2010 | Bainville et al. | |
| 2002/0152751 A1 | 10/2002 | Mandai et al. | |
| 2003/0066568 A1 * | 4/2003 | Hibino et al. | 138/121 |
| 2004/0050057 A1 | 3/2004 | Bland et al. | |
| 2004/0255589 A1 | 12/2004 | Yoshida et al. | |
| 2005/0050899 A1 | 3/2005 | Little | |
| 2005/0160717 A1 | 7/2005 | Sprouse et al. | |
| 2005/0229604 A1 | 10/2005 | Chen | |
| 2006/0101814 A1 | 5/2006 | Saitoh et al. | |
| 2007/0006590 A1 | 1/2007 | Muldoon et al. | |
| 2007/0079885 A1 * | 4/2007 | Zaborszki et al. | 138/121 |
| 2007/0204622 A1 | 9/2007 | Patel et al. | |
| 2007/0241560 A1 | 10/2007 | Malone | |
| 2008/0000214 A1 | 1/2008 | Kothnur et al. | |
| 2008/0036203 A1 | 2/2008 | Piccinali | |
| 2008/0066720 A1 | 3/2008 | Piper et al. | |
| 2008/0072599 A1 | 3/2008 | Morenko et al. | |
| 2008/0083223 A1 | 4/2008 | Prociw et al. | |
| 2009/0113893 A1 | 5/2009 | Li et al. | |
| 2009/0211256 A1 | 8/2009 | Williams | |
| 2010/0050645 A1 | 3/2010 | Haggerty | |
| 2010/0051726 A1 | 3/2010 | Houtman et al. | |
| 2010/0071663 A1 | 3/2010 | Patel et al. | |
| 2010/0096037 A1 | 4/2010 | Lee et al. | |
| 2010/0115966 A1 | 5/2010 | Nagai et al. | |
| 2010/0186829 A1 | 7/2010 | Guerineau | |
| 2010/0264652 A1 | 10/2010 | Mitterer et al. | |
| 2010/0326080 A1 | 12/2010 | Rogers et al. | |
| 2011/0067402 A1 | 3/2011 | Wiebe et al. | |
| 2011/0162373 A1 | 7/2011 | Intile et al. | |
| 2012/0049512 A1 | 3/2012 | Hayes | |
| 2015/0061282 A1 | 3/2015 | Faldt et al. | |

\* cited by examiner

FLEXIBLE HOSE ASSEMBLY WITH MULTIPLE FLOW PASSAGES

RELATED APPLICATIONS

This application claims the benefit of U.S. Provisional Application No. 61/420,803 filed Dec. 8, 2010, which is hereby incorporated herein by reference.

FIELD OF INVENTION

The present invention relates generally to gas turbine engines, and more particularly to flexible hose assemblies for gas turbine engines having multiple fuel passages.

BACKGROUND

A gas turbine engine typically includes one or more fuel injectors for directing fuel from a manifold to a combustion chamber of a combustor. Each fuel injector typically has an inlet fitting connected either directly or via tubing to the manifold, a tubular extension or stem connected at one end to the fitting, and one or more spray nozzles connected to the other end of the stem for directing the fuel into the combustion chamber. A fuel passage (e.g., a tube or cylindrical passage) extends through the stem to supply the fuel from the inlet fitting to the nozzle. Appropriate valves and/or flow dividers can be provided to direct and control the flow of fuel through the nozzle and/or fuel passage.

SUMMARY OF INVENTION

The present invention provides a flexible hose assembly having a flexible tube for conveying fuel through a first fuel passage formed interiorly of the flexible tube and a flexible hose surrounding the flexible tube and forming therewith a second fuel passage. The flexible tube provides internal support for the flexible hose while also allowing for flow of fuel through the second fuel passage and the fuel passages are separate from one another along a length of the flexible hose assembly. If one of the fuel passages is in a low flow or no flow condition, fuel flowing through the other of the fuel passages acts to cool the fuel passage in the low flow or no flow condition to prevent stagnant fuel in the passage from heating up and coking. This is useful, for example, when the flexible hose assembly is surrounded by a high temperature environment, such as greater than 250° Fahrenheit.

In one embodiment, the flexible hose assembly includes an inner tube configured to be coupled to the flexible tube, the first fuel passage being formed interiorly of the inner tube and the flexible tube, and a connector at least partially surrounding the inner tube and configured to be coupled to the flexible hose, the connector and flexible hose forming with the inner tube and flexible tube the second fuel passage.

In another embodiment, the flexible tube has a plurality of convolutes extending radially outward from a body of the flexible tube and along a length thereof.

According to another aspect of the invention, a fuel manifold and flexible hose assembly for a gas turbine is provided. The assembly includes a fuel manifold including a manifold fitting surrounding a manifold hose and a flexible hose assembly. The flexible hose assembly includes an inner tube, a connector at least partially surrounding the inner tube, the connector having a proximal end coupled to the manifold fitting, a flexible tube having a proximal end coupled to a distal end of the inner tube, a first fuel passage formed interiorly of the flexible tube and inner tube, and a flexible hose surrounding the flexible tube and having a proximal end coupled to a distal end of the connector, the flexible hose and connector forming with the inner tube and flexible hose a second fuel passage, wherein the flexible tube provides internal support for the flexible hose while also allowing for flow of fuel through the second fuel passage.

According to yet another aspect of the invention a method of delivering fuel from a manifold through a flexible hose assembly to a fuel injector is provided, the flexible hose assembly including a flexible tube and a flexible hose surrounding the flexible tube. The method includes delivering fuel to the injector through a first fuel passage formed interiorly of the flexible tube, and delivering fuel to the injector through a second fuel passage formed between the flexible tube and flexible hose, wherein the flexible tube provides internal support for the flexible hose while also allowing for flow of fuel through the second fuel passage.

The foregoing and other features of the invention are hereinafter described in greater detail with reference to the accompanying drawings.

DETAILED DESCRIPTION

Figure 1:
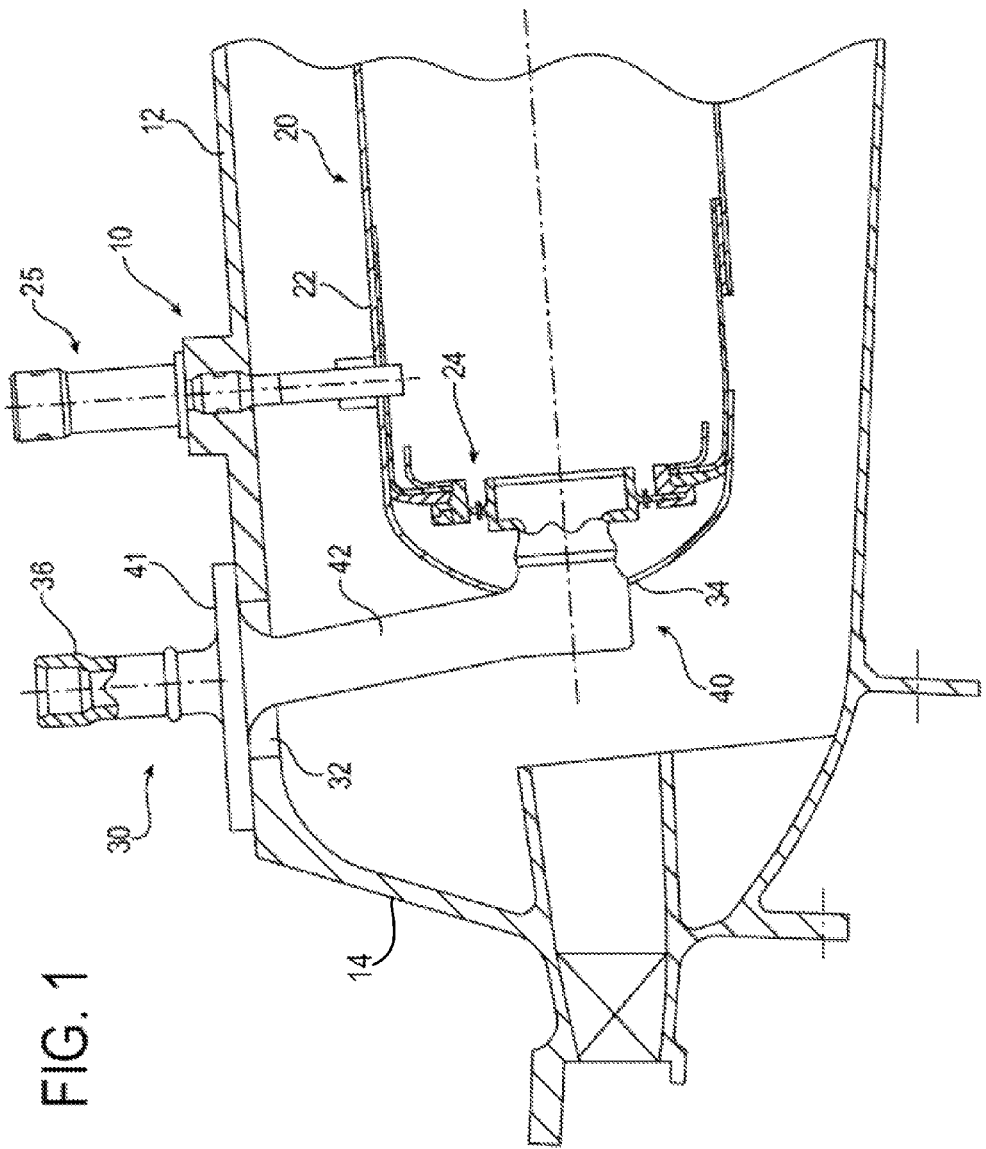
FIG. 1 is a cross-sectional view of a portion of an exemplary gas turbine engine illustrating a fuel injector in communication with a combustor.

Referring now in detail to the drawings and initially to FIG. 1, a gas turbine engine for an aircraft is illustrated generally at 10. The gas turbine engine 10 includes an outer casing 12 extending forwardly of an air diffuser 14. The casing 12 and diffuser 14 enclose a combustor, indicated generally at 20, for containment of burning fuel. The combustor 20 includes a liner 22 and a combustor dome, indicated generally at 24. An igniter, indicated generally at 25, is mounted to the casing 12 and extends inwardly into the combustor 20 for igniting fuel. The above components can be conventional in the art and their manufacture and fabrication are well known.

A fuel injector, indicated generally at 30, is received within an aperture 32 formed in the engine casing 12 and extends inwardly through an aperture 34 in the combustor liner 22. The fuel injector 30 includes a fitting 36 exterior of the engine casing 12 for receiving fuel, as by connection to a fuel manifold 44 (FIGS. 2A and 2B) via a flexible hose assembly 64 (FIG. 3); a fuel nozzle tip assembly, indicated generally at 40, disposed within the combustor 20 for dispensing fuel; and a housing 42 interconnecting and structurally supporting the nozzle tip assembly 40 with respect to fitting 36. The fuel injector 30 is suitably secured to the engine casing 12, as by means of an annular flange 41 that may be formed in one piece with the housing 42 proximate the fitting 36. The flange 41 extends radially outward from the housing 42 and includes appropriate means, such as apertures, to allow the flange 41 to be easily and securely connected to, and disconnected from, the casing 12 of the engine using, for example, bolts or rivets.

Figure 2A:
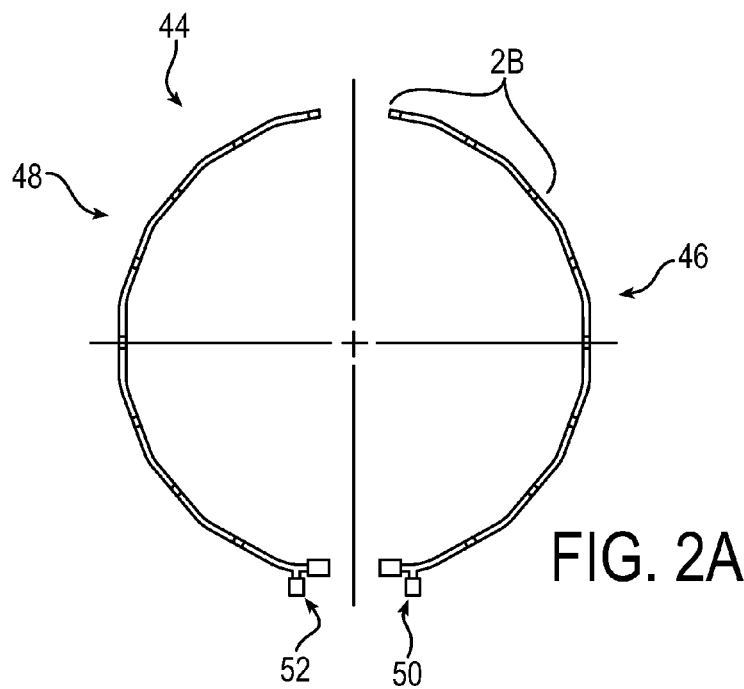
FIG. 2A is a front view of two manifold halves according to the invention.
Figure 2B:
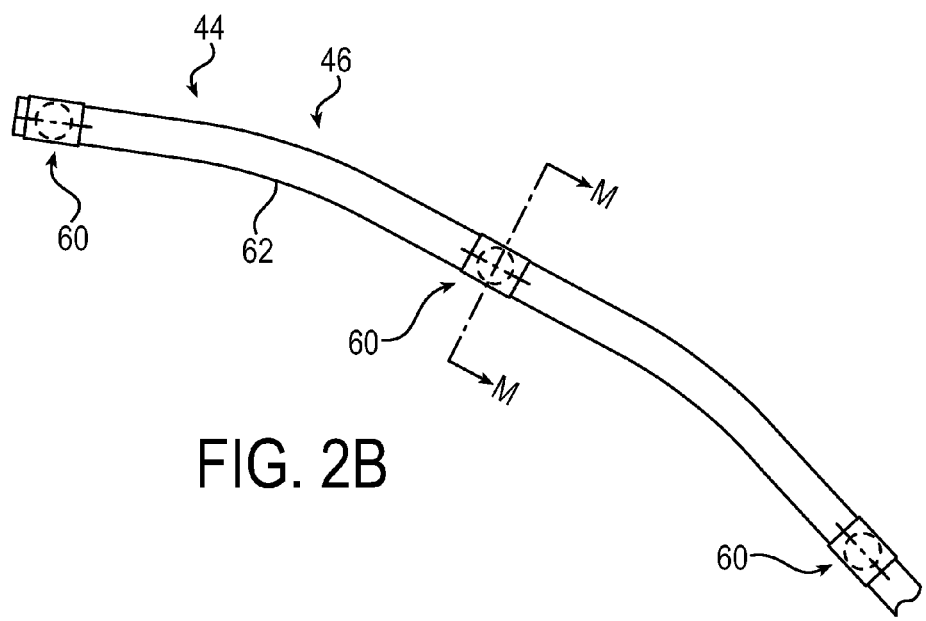
FIG. 2B is a front view of a portion of a manifold half shown in FIG. 2A.

Turning now to FIGS. 2A and 2B, the fuel manifold 44 is shown including two halves 46 and 48, which may be substantially similar to one another, having respective inlets 50 and 52 for receiving fuel. Although shown in two halves, it will be appreciated that the manifold may be separated into thirds, fourths, be a single continuous manifold, etc. Each manifold half 46, 48 includes at least one manifold fitting 60, and in the illustrated embodiment a plurality of manifold fittings, which may be of the types disclosed in, U.S. patent application Ser. No. 13/315,165 entitled MULTIPLE CIRCUIT FUEL MANIFOLD which is hereby incorporated herein by reference. The manifold fittings 60 surround a manifold hose 62 that provides fuel from the manifold inlets to the plurality of manifold fittings.

Figure 3:
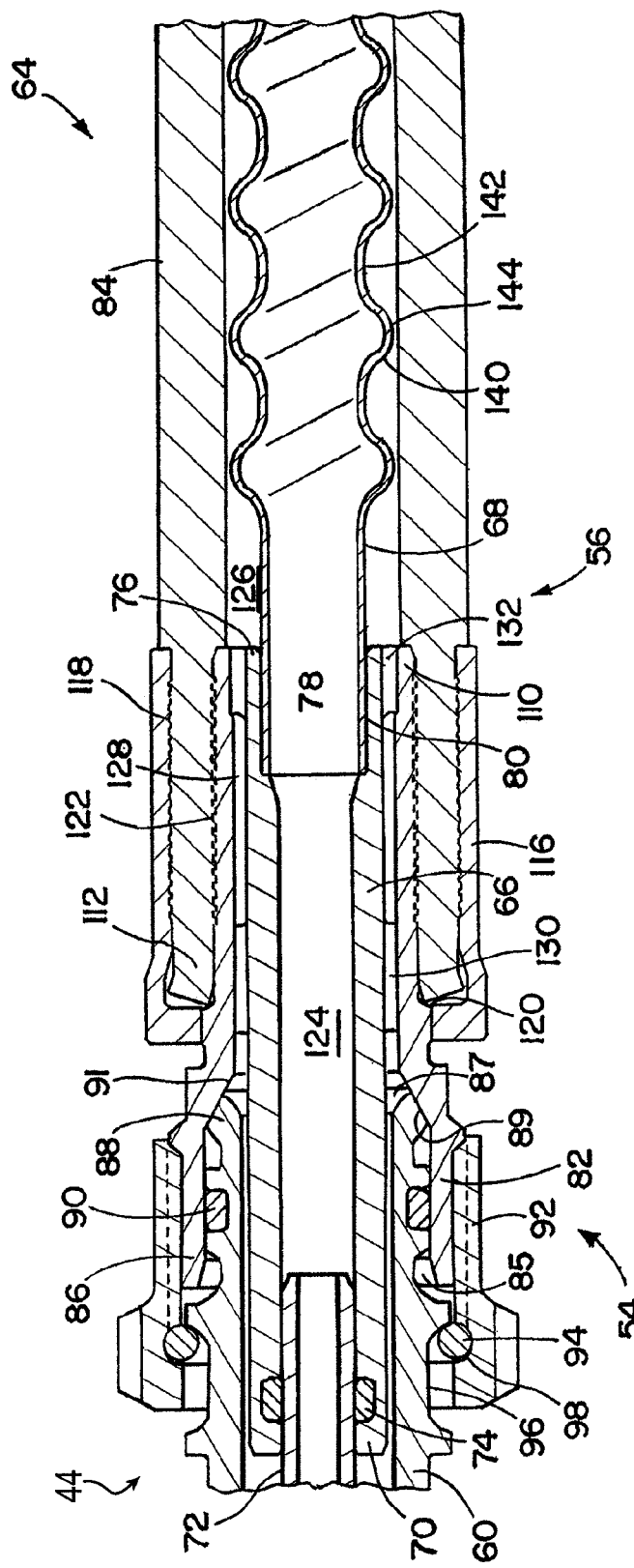
FIG. 3 is a cross-sectional view of a blown up portion of FIG. 2 illustrating an exemplary flexible hose assembly taken substantially along the line M-M.

Turning now to FIG. 3, the exemplary flexible hose assembly 64 is shown. The flexible hose assembly includes a fitting portion 54 configured to be coupled to the manifold fitting 60 and a tube portion 56 configured to be coupled to the fitting portion 54, as will be described below, so that fuel in the manifold can be distributed to a plurality of fuel injectors 30. The flexible hose assembly includes a first connector tube 66, which may be any suitable material such as stainless steel or nickel based alloy, and a flexible tube 68, which may be made of any suitable material such as stainless steel or nickel based alloy.

The first connector tube 66 has a proximal end 70 surrounding a second connector tube 72 such that an outer circumferential wall of the second connector tube abuts an inner circumferential wall of the first connector tube. The first connector tube 66 may be sealed to the second connector tube by any suitable means, such as by O-ring 74. The first connector tube 66 is free to slide relative to the second connector tube 72, for example during installation or due to vibration from the engine. The first connector tube 66 also has a distal end 76 surrounding a proximal end 78 of the flexible tube 68 such that an outer circumferential wall of the flexible tube abuts the inner circumferential wall of the first connector tube. The distal end 76 is coupled to the proximal end 78 by any suitable means, such as by brazing or welding at 80.

The flexible hose assembly also includes a connector, such as nipple 82 surrounding at least a portion of the first connector tube 66, and a flexible hose 84 surrounding at least a portion of the nipple 82 and the flexible tube 68. The flexible hose 84 and flexible tube 68 are concentric and make up the tube portion 56. The nipple may be made of any suitable material, such as stainless steel or nickel based alloy, and the flexible hose may be made of any suitable material, and may be of the type disclosed in U.S. patent application Ser. No. 12/578,079, which is hereby incorporated herein by reference.

The nipple 82 has an opening 85 at a proximal end 86 for receiving an end 88 of the manifold fitting 60 having an opening 87. The proximal end 86 of the nipple is sealed to the manifold fitting by any suitable means, such as by O-ring 90. The end 88 of the manifold fitting 60 is configured to be inserted into the opening 85 of the nipple until a tapered portion 89 at the distal end 88 contacts a tapered shoulder 91 on an inner portion of the nipple 82, which is also a sealing surface.

To secure the end 88 of the manifold fitting 60 in the nipple 82, a nut 92 is provided that surrounds and is coupled to the proximal end 86 of the nipple 82 and the end 88 of the manifold fitting 60. The nut 92 may be coupled to the proximal end 86 of the nipple by any suitable means, for example by threads on an inner circumferential surface of the nut 92 being coupled to threads on an outer circumferential surface of the proximal end 86. The nut 92 may be coupled to the end 88 of the manifold fitting 60 by any suitable means, for example by a thrust wire 94 being received in groove 96 of the manifold fitting 60 and groove 98 of the nut 92. It will be appreciated from the foregoing that various other fitting types may be used to couple the manifold fitting to the tube portion 56.

The nipple 82 also has a distal end 110 that is surrounded by a proximal end 112 of the flexible hose 84 and coupled to the flexible hose 84 in any suitable manner. For example, a socket 116 may be provided that surrounds the nipple 82 and the flexible hose 84. The socket 116 includes grooves 118 on an inner circumferential surface and an opening 120 configured to be seated on an outer circumferential surface of the nipple 82. The socket can by coupled to the flexible hose 84 in any suitable manner, for example the grooves 118 can bite into an outer circumferential surface of the proximal end 112 of the flexible hose 84 to form a crimped sealing connection. The crimping causes grooves 122 on an outer circumferential surface of the nipple 82 to bite into an inner circumferential surface of the proximal end 112 of the flexible hose 84 to form a crimped connection. In this way, the flexible hose 84 can be securely coupled to the nipple 82.

Once assembled, a first fuel passage 124 is provided interiorly of the first and second connector tubes 66 and 72 and the flexible tube 68, and a second fuel passage 126 is provided by a gap 128 between the inner connector tube 66 and the nipple 82 and between the flexible tube 68 and the flexible hose 84. The fuel passages 124 and 126 are separated and sealed from one another from the manifold 44 to the injector 30 and eliminate the need for multiple hoses running from a manifold to each injector. It will be appreciated that although described as providing two fuel passages, more than two passages may be provided in the flexible hose assembly 64.

During staging of the gas turbine, for example, one of the fuel passages may be in a low flow or no flow condition, which may result in stagnant fuel collecting in the fuel passage. Fuel flowing through the other of the fuel passages acts to cool the fuel passage in the low flow or no flow condition to prevent the stagnant fuel from heating up and coking. When the engine is started for example, fuel may be provided through the second fuel passage 126. As the engine increases in speed, the first fuel passage 124 is opened and fuel provided to the engine through the first fuel passage 124. The second fuel passage 126 can then be closed, i.e. be in the no flow condition, and the flow through the first fuel passage 124 will act to cool the second fuel passage.

One or more centering lugs 130 may be provided between the first connector tube 66 and the nipple 82 that prevent the first connector tube from contacting an inner wall of the nipple to maintain the gap 128 between the connector tube 66 and nipple 82. The centering lug may have, for example, a circular portion surrounding the first connector tube 66 and a plurality of protrusions extending radially outward from the circular portion that contact an inner circumferential surface of the nipple 82, which will allow fuel flow between the lugs to pass freely. One or more braze joints 132 may also be provided, for example between the distal end 110 of the nipple 82 and the distal end 76 of the first connector tube 66, to prevent the first connector tube from contacting the inner wall of the nipple. The braze joints 132 also prevent the nipple 82 from collapsing upon the first connector 66 during crimping.

Figure 4:
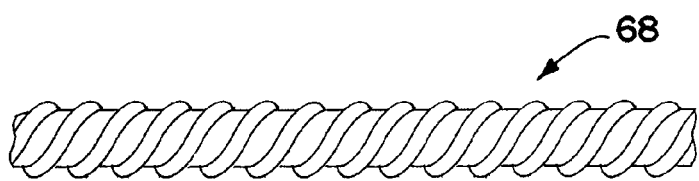
FIG. 4 is a side view of a flexible tube according to the invention.
Figure 5:
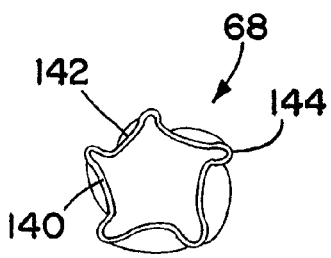
FIG. 5 is a front view of the flexible tube of FIG. 4
Figure 6:
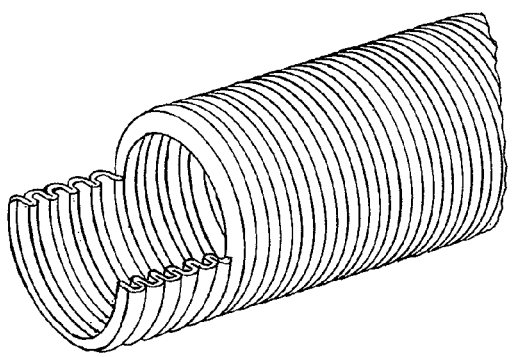
FIG. 6 is a perspective view of another flexible tube according to the invention.
Figure 7:
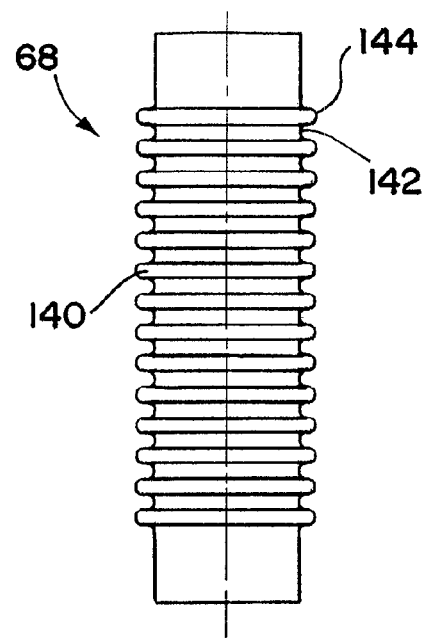
FIG. 7 is a side view of the flexible tube of FIG. 6.
Figure 8:
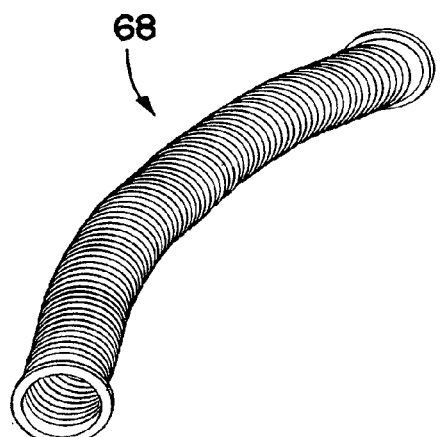
FIG. 8 is another perspective view of the flexible tube of FIG. 6.

Turning now to FIGS. 4-8, the flexible tube 68 is shown as a flexible metal tube having a plurality of convolutes 140 extending outward from a body 142 of the tube 68. The convolutes provide flexibility to the tube 68 and maintain flow through the fuel passage 124 during bending of the tube 78 and hose 68. The flexible tube may be in the form of a twisted or spiral tube, as shown in FIGS. 4 and 5, a bellows as shown in FIGS. 6-8, a beaded tube, a corrugated tube, etc, and may be varied in size, for example in width or pitch. The flexible metal tube 68 allows for turbulent flow through the second fuel passage and can withstand high fuel pressures from the fuel passing through the first and second flow passages 124 and 126.

The convolutes may be sized so that a distance from a center point of the flexible tube 68 to an outer portion 144 of the convolutes is less than or substantially equal to the radius of the flexible hose 84. During bending or flexing of the flexible hose 84, an inner circumferential surface of the flexible hose can contact the outer portion 144 at one or more locations. In this way, when the length of the flexible hose 84 is changed, the length of the flexible tube 68 changes so that the flexible hose is supported by the flexible tube to allow fuel to flow through the second fuel passage 126 without the hose 84 kinking or completely obstructing flow. For example, in FIGS. 4 and 5 fuel can flow along the spiral flow path in-between the flexible hose 84 and flexible tube 68 and in FIGS. 6-8 fuel can flow through portions of the flow passage 126 where the outer portion 144 does not contact the inner circumferential surface of the flexible hose 84.

Turning now to FIGS. 9-17, exemplary embodiments of a flexible hose assembly are shown at 164, 264, 364, 464, 564, 664, 764, 864 and 964, respectively. The flexible hose assemblies of FIGS. 9-17 are substantially the same as the above-referenced flexible hose assembly 64, and consequently the same reference numerals, but indexed by 100-900 respectively are used to denote structures corresponding to similar structures in the flexible hose assemblies. In addition, the foregoing description of the flexible hose assembly 64 is equally applicable to the flexible hose assemblies of FIGS. 9-17 except as noted below. Moreover, it will be appreciated upon reading and understanding the specification that aspects of the flexible hose assemblies may be substituted for one another or used in conjunction with one another where applicable.

Figure 9:
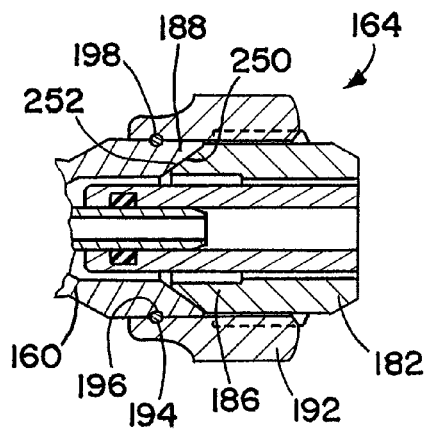
FIG. 9 is a partial cross-sectional view of another exemplary flexible hose assembly according to the invention.

Referring now to FIG. 9, a proximal end 186 of a nipple 182 and an end 188 of a manifold fitting 160 each have a tapered portion 250 and 252, respectively, that abut to form a flared fitting. A nut 192 may be provided to secure the end 188 of the manifold fitting to the proximal end 186 of the nipple 182. The nut 192 may be coupled to the proximal end 186 of the nipple 182 by any suitable means, for example by the threaded connection. The nut 192 may be coupled to the end 188 of the manifold fitting 160 by any suitable means, for example by a thrust wire 194 received in groove 196 of the manifold fitting 160 and groove 198 of the nut 192.

Figure 10:
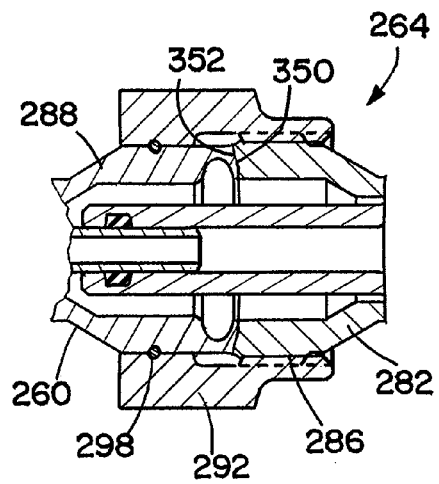
FIG. 10 is a partial cross-sectional view of still another exemplary flexible hose assembly according to the invention.

Referring now to FIG. 10, a proximal end 286 of a nipple 282 and an end 288 of a manifold fitting 260 each have a tapered portion 350 and 352, respectively, that abut to form a beam seal fitting. A nut 292 may be provided that is coupled to the nipple 282 and the manifold fitting 260 as described above to secure the end 288 of the manifold fitting to the proximal end 286 of the nipple.

Figure 11:
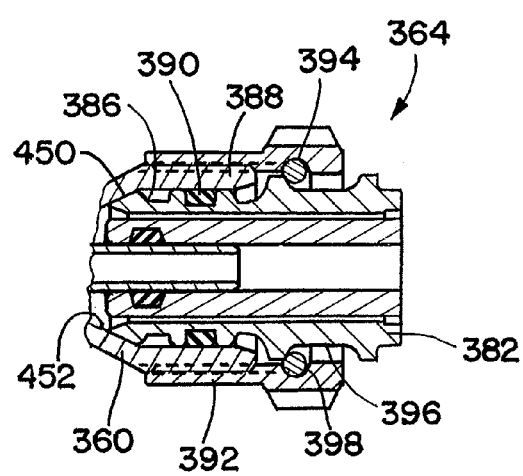
FIG. 11 is a partial cross-sectional view of yet another exemplary flexible hose assembly according to the invention.

Referring now to FIG. 11, another connection is shown that is a reversal of FIG. 3, wherein an end 388 of a manifold fitting 360 surrounds a proximal end 386 of the nipple 382 and is sealed to the nipple by any suitable means, such as by O-ring 390. The proximal end 386 of the nipple 382 is configured to be inserted into the manifold fitting 360 until a tapered portion 450 of the proximal end 386 contacts a tapered shoulder 452 on an inner portion of the manifold fitting 360.

To secure the proximal end 386 of the nipple in the manifold fitting 360, a nut 392 is provided that surrounds and is coupled to the proximal end 386 of the nipple 382 and the end 388 of the manifold fitting 360. The nut 392 may be coupled to the end 388 of the manifold fitting by any suitable means, for example by threads on an inner circumferential surface of the nut 392 being coupled to threads on an outer circumferential surface of the end 388. The nut 392 may be coupled to the proximal end 386 of the nipple 382 by any suitable means, for example by a thrust wire 394 being received in groove 396 of the nipple 382 and groove 398 of the nut 392.

Figure 12:
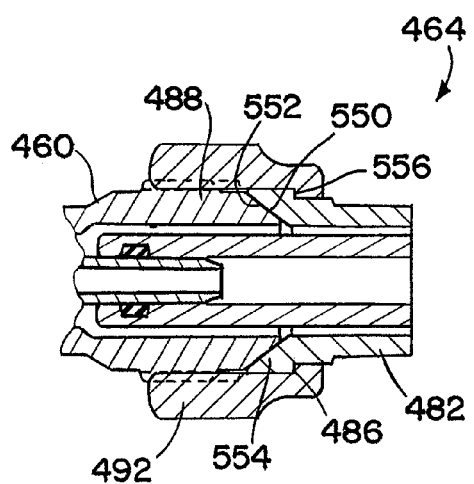
FIG. 12 is a partial cross-sectional view of a further exemplary flexible hose assembly according to the invention.

Turning now to FIG. 12, a proximal end 486 of the nipple 482 and an end 488 of the manifold fitting 460 each have a tapered portion 550 and 552, respectively, that abut to form a flared fitting. A nut 492, which surrounds the manifold fitting and the nipple, may be provided to secure the end 488 of the manifold fitting 460 to the proximal end 486 of the nipple 482. The nut 492 may be coupled to the end 488 of the manifold fitting 460 by any suitable means, for example by the threaded connection discussed above. When the nut is coupled to the end 488, a flanged portion 554 of the nipple abuts an inner shoulder 556 of the nut, thereby holding the nipple in place.

Figure 13:
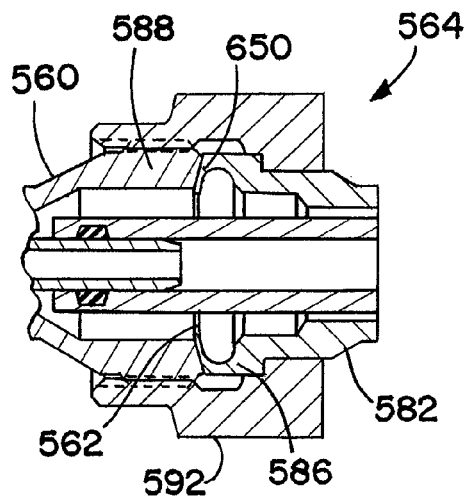
FIG. 13 is a partial cross-sectional view of another exemplary flexible hose assembly according to the invention.

Turning now to FIG. 13, a proximal end 586 of the nipple 582 and an end 588 of the manifold fitting 560 each have a tapered portion 650 and 652, respectively, that abut to form a beam seal fitting. A nut 592 may be provided that is coupled to the manifold fitting 560 and the nipple 582 as described above in FIG. 12 to secure the end 588 of the manifold fitting to the proximal end 586 of the nipple.

Figure 14:
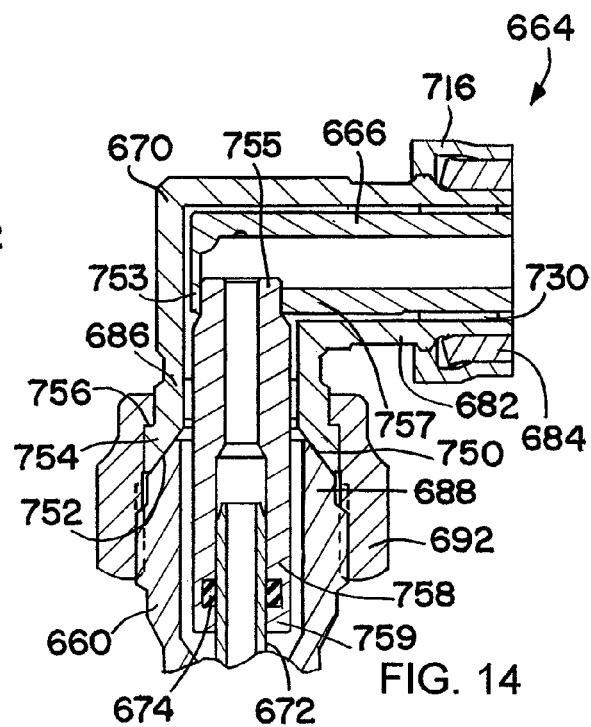
FIG. 14 is a partial cross-sectional view of still another exemplary flexible hose assembly according to the invention.

Turning now to FIG. 14, the flexible hose assembly 664 is shown having an angled nipple 682 providing an angled connection between the manifold fitting 660 and the flexible hose 684. The angled connection may be provided to accommodate different plumbing and piping configurations in an engine. Although shown as a 90° angle, it will be appreciated that the flexible hose assembly may be formed having any suitable angle.

As shown, a proximal end 686 of the nipple 682 and an end 688 of the manifold fitting 660 each have a tapered portion 750 and 752, respectively, that abut to form a flared fitting. A nut 692, which surrounds the manifold fitting and the nipple, may be provided to secure the end 688 of the manifold fitting to the proximal end 686 of the nipple 682. The nut 692 may be coupled to the end 688 of the manifold fitting 660 by any suitable means, for example by the threaded connection. When the nut is coupled to the end 688, a flanged portion 754 of the nipple 682 abuts the inner shoulder 756 of the nut 692, thereby holding the nipple in place.

Disposed within the angled nipple 682 is a first connector tube 666 that is closed at a proximal end 670 and has an opening 753 in a side wall of tube 666 at the proximal end 670. The opening 753 surrounds a distal end 755 of a third connector tube 758, which is disposed within the angled nipple 682 and the manifold fitting 660, such that the first and second connector tubes are orthogonal to provide angled flow through the flexible hose assembly. The third connector tube 758 may be made of any suitable material, such as stainless steel or nickel based alloy, and may be coupled to the first connector tube by any suitable means, such as by brazing or welding at 757. A proximal end 759 of the third connector tube 758 surrounds the second connector tube 672 and is sealed to the second connector tube by any suitable means, such as by O-ring 674. The third connector tube 758 is free to slide relative to the second connector tube 672, for example during installation or due to vibration from the engine.

Figure 15:
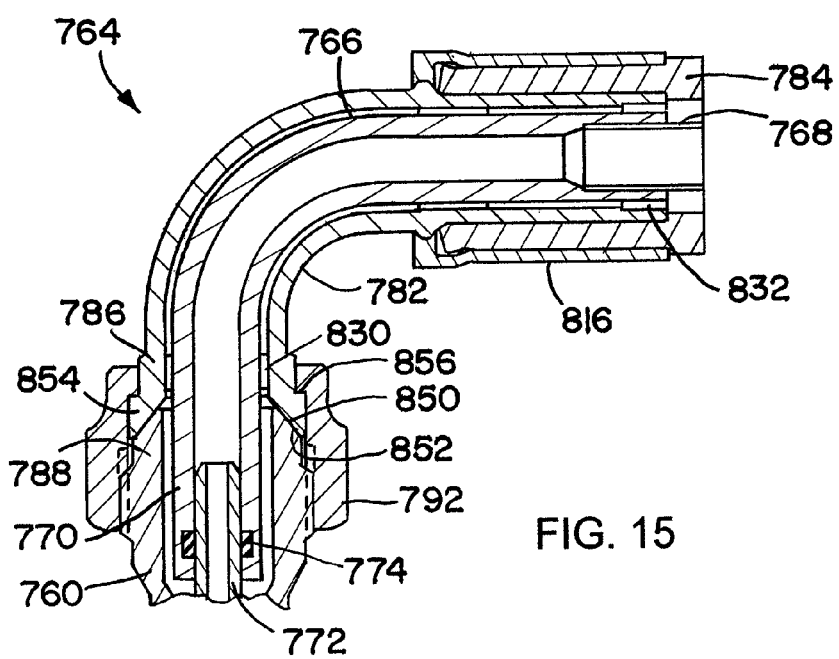
FIG. 15 is a partial cross-sectional view of yet another exemplary flexible hose assembly according to the invention.

Turning now to FIG. 15, the flexible hose assembly the flexible hose assembly 764 is shown having a curved nipple 782 providing an angled connection between the manifold fitting 760 and the flexible hose 784. The angled connection may be provided to accommodate different plumbing and piping configurations in an engine. Although shown as being curved to provide a 90° angle, it will be appreciated that the flexible hose assembly may be curved to accommodate any suitable angle.

Similar to the flexible hose assembly of FIG. 14, a proximal end 786 of the nipple 782 and an end 788 of the manifold fitting 760 each have a tapered portion 850 and 852, respectively, that abut to form a flared fitting. A nut 792, which surrounds the manifold fitting and the nipple, may be provided to secure the end 788 of the manifold fitting to the proximal end 786 of the nipple 782. The nut 792 may be coupled to the end 788 of the manifold fitting 760 by any suitable means, for example by the threaded connection. When the nut is coupled to the end 688, a flanged portion 854 of the nipple 782 abuts the inner shoulder 856 of the nut 792, thereby holding the nipple in place.

Disposed within the curved nipple 782 is a first connector tube 766, which has a proximal end 770 surrounding a second connector tube 772 and sealed to the second connector tube by any suitable means, such as by O-ring 774. The first connector tube 766 is free to slide relative to the second connector tube 772, for example during installation or due to vibration from the engine.

Figure 16:
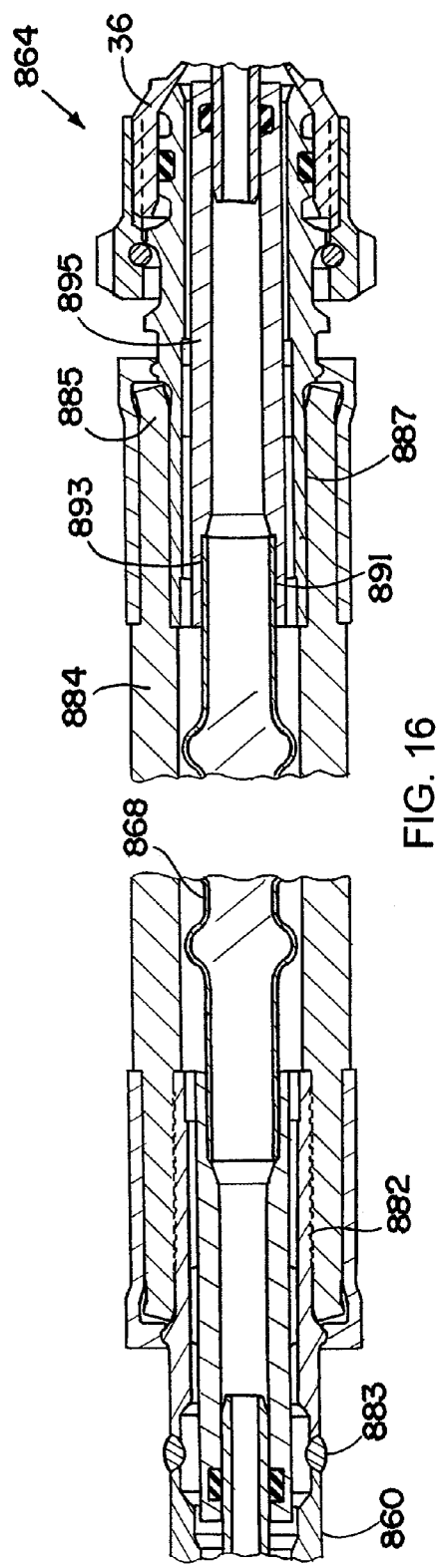
FIG. 16 is a partial cross-sectional view of a further exemplary flexible hose assembly according to the invention.

Referring now to FIG. 16, the nipple 882 may be coupled to the manifold fitting 860 by a weld or braze at 883. At a distal end 885 of the flexible hose 884, the hose may be coupled to a nipple 887 in a similar manner to the nipple 882, and the nipple may be coupled to a fitting, such as fitting 36, by any suitable means. For example, FIG. 16 shows the nipple 887 being coupled to the fitting 36 in a similar manner as nipple 382 is coupled to manifold fitting 360 described in FIG. 11. FIG. 16 also shows a distal end 891 of the flexible tube 968 being surrounded by and coupled to a connector tube 895 by a weld or braze at 893.

Figure 17:
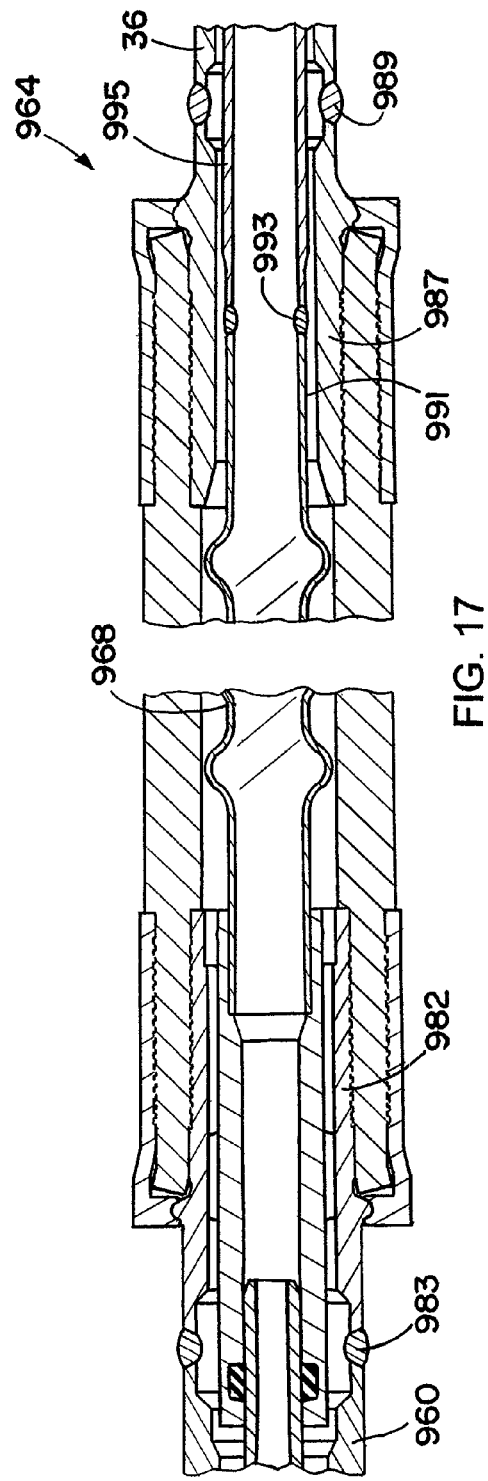
FIG. 17 is a partial cross-sectional view of another exemplary flexible hose assembly according to the invention.

Referring now to FIG. 17, the nipple 982 may be coupled to the manifold fitting 960 by a weld or braze at 983. At a distal end 985 of the flexible hose 984, the hose may be coupled to a nipple 987 as described above, and the nipple may be coupled to a fitting, such as fitting 36, by any suitable means. For example, FIG. 17 shows the nipple 987 being coupled to the fitting 36 by a weld or braze at 989. FIG. 17 also shows a distal end 991 of the flexible tube 968 being coupled to a connector tube 995 by a weld or braze at 993.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A flexible hose assembly configured to be coupled to a fuel manifold, the flexible hose assembly including:
   a flexible tube for conveying fuel through a first fuel passage formed interiorly of the flexible tube;
   a flexible hose surrounding the flexible tube and forming therewith a second fuel passage;
   wherein the flexible tube provides internal support for the flexible hose when contacting an inner diameter of the flexible hose at a plurality of locations along the length of the flexible hose, which locations are longitudinally-spaced apart to allow for flow of fuel through the second fuel passage;
   an inner tube coupled to the flexible tube, the first fuel passage being formed interiorly of the inner tube and the flexible tube; and
   a connector at least partially surrounding the inner tube and coupled to the flexible hose, the connector and flexible hose forming with the inner tube and flexible tube the second fuel passage, the connector having a threaded portion onto which a nut can be threaded for coupling the flexible hose assembly to the fuel manifold, and the threaded portion surrounding each of the first fuel passage and the second fuel passage, wherein the flexible tube has a plurality of convolutes extending radially outward from a body of the flexible tube and along a length thereof.

2. A flexible hose assembly according to claim 1, wherein the connector includes a plurality of grooves on an outer circumferential surface configured to bite into an inner circumferential surface of the flexible hose to couple the connector to the flexible hose.

3. A flexible hose assembly according to claim 2, further comprising a socket surrounding a portion of the connector and the flexible hose, the socket including a plurality of grooves on an inner circumferential surface, and the socket configured to be crimped to bite into an outer circumferential surface of the of the flexible hose.

4. A flexible hose assembly according to claim 1, further including at least one centering lug interposed between the inner tube and the connector for maintaining the second flow passage therebetween.

5. A flexible hose assembly according to claim 1, in combination with a manifold, wherein the connector is an angled connector providing an angled connection between the flexible hose and the manifold.

6. A flexible hose assembly according to claim 1, wherein a distance from a center of the flexible tube to an outer surface of each convolute is less than or equal to a radius of the flexible hose.

7. A flexible hose assembly according to claim 6, wherein the outer surface of at least one convolute is configured to contact the flexible hose during bending or flexing of the flexible hose to support the flexible hose while also allowing for flow of fuel through the second fuel passage.

8. A method of delivering fuel from a manifold to a fuel injector through a flexible hose assembly according to claim 1, the method including:
   delivering fuel to the fuel injector through the first fuel passage; and
   delivering fuel to the fuel injector through the second fuel passage.

9. A flexible hose assembly according to claim 1, wherein the first fuel passage and the second fuel passage are concentric at the location of the threaded portion along the length of the flexible hose assembly.

10. A flexible hose assembly according to claim 1, wherein the first fuel passage and the second fuel passage extend axially to the axial end of the flexible hose assembly and terminate at axially opening outlets at the axial end of the flexible hose assembly.

11. A flexible hose assembly according to claim 1, wherein the flexible tube is a spiral tube and the second fuel passage is a spiral fuel passage between the flexible tube and flexible hose.

12. A flexible hose assembly according to claim 1, wherein the flexible tube is a bellows or beaded tube.

13. A flexible hose assembly configured to be coupled to a fuel manifold, the flexible hose assembly including:
   a flexible tube for conveying fuel through a first fuel passage formed interiorly of the flexible tube;
   a flexible hose surrounding the flexible tube and forming therewith a second fuel passage;
   wherein the flexible tube provides internal support for the flexible hose when contacting an inner diameter of the flexible hose at a plurality of locations along the length of the flexible hose, which locations are longitudinally-spaced apart to allow for flow of fuel through the second fuel passage;
   an inner tube coupled to the flexible tube, the first fuel passage being formed interiorly of the inner tube and the flexible tube;
   a connector at least partially surrounding the inner tube and coupled to the flexible hose, the connector and flexible hose forming with the inner tube and flexible tube the second fuel passage, the connector having a threaded portion onto which a nut can be threaded for coupling the flexible hose assembly to the fuel manifold, and the threaded portion surrounding each of the first fuel passage and the second fuel passage; and
   at least one braze joint between the inner tube and the connector for maintaining the second flow passage therebetween.

14. A flexible hose assembly configured to be coupled to a fuel manifold, the flexible hose assembly including:
   a flexible tube for conveying fuel through a first fuel passage formed interiorly of the flexible tube;
   a flexible hose surrounding the flexible tube and forming therewith a second fuel passage;
   wherein the flexible tube provides internal support for the flexible hose when contacting an inner diameter of the flexible hose at a plurality of locations along the length of the flexible hose, which locations are longitudinally-spaced apart to allow for flow of fuel through the second fuel passage;
   an inner tube coupled to the flexible tube, the first fuel passage being formed interiorly of the inner tube and the flexible tube; and
   a connector at least partially surrounding the inner tube and coupled to the flexible hose, the connector and flexible hose forming with the inner tube and flexible tube the second fuel passage, the connector having a threaded portion onto which a nut can be threaded for coupling the flexible hose assembly to the fuel manifold, and the threaded portion surrounding each of the first fuel passage and the second fuel passage,
   wherein the flexible tube is a spiral tube and the second fuel passage is a spiral fuel passage between the flexible tube and flexible hose.

15. A flexible hose assembly configured to be coupled to a fuel manifold, the flexible hose assembly including:
   a flexible tube for conveying fuel through a first fuel passage formed interiorly of the flexible tube;
   a flexible hose surrounding the flexible tube and forming therewith a second fuel passage;
   wherein the flexible tube provides internal support for the flexible hose when contacting an inner diameter of the flexible hose at a plurality of locations along the length of the flexible hose, which locations are longitudinally-spaced apart to allow for flow of fuel through the second fuel passage;
   an inner tube coupled to the flexible tube, the first fuel passage being formed interiorly of the inner tube and the flexible tube; and
   a connector at least partially surrounding the inner tube and coupled to the flexible hose, the connector and flexible hose forming with the inner tube and flexible tube the second fuel passage, the connector having a threaded portion onto which a nut can be threaded for coupling the flexible hose assembly to the fuel manifold, and the threaded portion surrounding each of the first fuel passage and the second fuel passage,
   wherein the flexible tube is a bellows or beaded tube.

16. A fuel manifold and flexible hose assembly including:
   a fuel manifold having a manifold fitting surrounding a manifold hose; and a flexible hose assembly configured to be coupled to the fuel manifold, the flexible hose assembly including a flexible tube for conveying fuel through a first fuel passage formed interiorly of the flexible tube;

a flexible hose surrounding the flexible tube and forming therewith a second fuel passage;

wherein the flexible tube provides internal support for the flexible hose when contacting an inner diameter of the flexible hose at a plurality of locations along the length of the flexible hose, which locations are longitudinally-spaced apart to allow for flow of fuel through the second fuel passage;

an inner tube coupled to the flexible tube, the first fuel passage being formed interiorly of the inner tube and the flexible tube; and a connector at least partially surrounding the inner tube and coupled to the flexible hose, the connector and flexible hose forming with the inner tube and flexible tube the second fuel passage, the connector having a threaded portion onto which a nut can be threaded for coupling the flexible hose assembly to the fuel manifold, and the threaded portion surrounding each of the first fuel passage and the second fuel passage, wherein the connector has a proximal end coupled to the manifold fitting.

17. A fuel manifold and flexible hose assembly according to claim 16, further including:

a nut coupled to the manifold fitting and having an inner circumferential groove and a nut threaded portion axially spaced from the groove on an inner circumferential surface of the nut;

wherein the nut threaded portion is configured to be coupled to the threaded portion on an outer circumferential surface of the connector; and wherein a thrust wire is configured to be received in the inner circumferential groove of the nut threaded portion and in an outer circumferential groove of the manifold fitting.

18. A fuel manifold and flexible hose assembly according to claim 16, further including:

a nut coupled to the manifold fitting and having a nut threaded portion on an inner circumferential surface of the nut;

wherein the nut threaded portion is configured to be coupled to the threaded portion on an outer circumferential surface of the connector of the flexible hose assembly.

19. A fuel manifold and flexible hose assembly according to claim 16, the manifold further including a nut coupled to and surrounding the manifold fitting, wherein the nut is threadedly coupled to the threaded portion at a proximal end of the connector.

20. A flexible hose assembly configured to be coupled to an external component, the flexible hose assembly including:

a flexible tube for conveying fuel through a first fuel passage formed interiorly of the flexible tube; and a flexible hose surrounding the flexible tube and forming therewith a second fuel passage;

wherein the flexible tube is convoluted to provide internal support for the flexible hose when contacting an inner diameter of the flexible hose at a plurality of locations along the length of the flexible hose, which locations are longitudinally-spaced apart to allow for flow of fuel through the second fuel passage; and an inner tube coupled to the flexible tube, the first fuel passage being formed interiorly of the inner tube and the flexible tube; and a connector at least partially surrounding the inner tube and coupled to the flexible hose, the connector and flexible hose forming with the inner tube and flexible tube the second fuel passage, wherein the connector is configured for connection to the external component, and wherein the first fuel passage and the second fuel passage extend axially to the axial end of the flexible hose assembly and terminate at axially opening outlets at the axial end of the flexible hose assembly.

21. A flexible hose assembly according to claim 20, wherein the axially opening outlets of the first fuel passage and the second fuel passage are concentric.

* * * * *